Oct. 11, 1955     A. E. BLOMQUIST     2,720,274

VEHICLE WHEEL MOUNTING MEANS

Filed July 8, 1953

INVENTOR.
ALBERT E. BLOMQUIST
BY Kenyon & Kenyon
ATTORNEYS

United States Patent Office 2,720,274
Patented Oct. 11, 1955

2,720,274

VEHICLE WHEEL MOUNTING MEANS

Albert E. Blomquist, Ringoes, N. J., assignor to Fairchild Engine and Airplane Corporation, Hagerstown, Md., a corporation of Maryland Application July 8, 1953, Serial No. 366,720

10 Claims. (Cl. 180—60)

This invention relates to vehicle wheel mounting means for mounting a wheel with reference to the body of a vehicle and it relates more particularly to vehicle wheel mounting means which comprises shock absorbing means for resiliently absorbing shocks received by the wheel so that the shocks received by the wheel may be transmitted to the body of the vehicle with diminished intensity.

It is an object of this invention to provide shock absorbing mounting means for a vehicle wheel whereby the normal position of the wheel in relation to the vehicle body may be varied and whereby at the same time power line means from external power supply means may be maintained operatively connected to mechanical means carried by wheel-holding means even though such mechanical means may be enclosed in a housing.

A feature of this invention resides in the provision of a shock absorber which comprises compressible resilient means confined within a cylinder so as to be acted upon by a piston in supporting the vehicle body in receiving shocks and which is adjustable so that the location of the piston for effective action may be varied relative to the cylinder in which it operates and to the vehicle body as the result of control of the location of a floating piston that is also disposed within the cylinder between the first-mentioned principal piston and the closed-off end of the cylinder and whose position may be varied responsive to admission or removal of an incompressible liquid such as oil to or from the space between the floating piston and the closed-off end of the cylinder. The aforesaid resilient means is confined within the cylinder between the two pistons and preferably consists of air whose pressure may be varied according to load and the operational effect requirements.

A further feature of this invention resides in the provision of conduit means whereby power line means may be operatively connected to mechanical means associated with the wheel-holding means through the shock absorber itself, the conduit means passing longitudinally through the piston rod, the piston secured thereto, from the piston through the cylinder to the closed-off end thereof and through the closed-off end. In such case the floating piston is disposed in slidable relation about the conduit means in the region of the cylinder between the principal piston and the closed-off end of the cylinder. This conduit means moves with the piston and piston rod relative to the cylinder; and power line means can be directed therethrough from outside power supply means to mechanical means carried by the wheel-holding member. For example, the wheel-holding member may comprise a housing for a motor for effecting rotation of the wheel and electric wires may be directed through the conduit means from an outside source of electric current to the motor within the housing for operating the motor and rotating the wheel. This conduit means remains effective notwithstanding the adjustability feature that has been mentioned above.

By the vehicle wheel mounting means of this invention great flexibility of adjustment is afforded using simple means. The amount and pressure of the air confined between the two pistons is subject to control and adjustment as may be desired according to load, the shocks likely to be encountered, the character of the shock absorbing action desired, etc. Such adjustments tend to vary the position of the wheel relative to the vehicle, and both for initially determining the desired position of the wheel relative to the vehicle body and for offsetting the effect of the aforesaid adjustments, the position of the floating piston may be adjusted and controlled as desired. Moreover, for emergency conditions or the like the combination is such that by forcing the floating piston down far enough the entire wheel can be moved downwardly relative to the vehicle body, thereby elevating the vehicle from the ground. On the other hand, by moving the floating piston far enough upwardly relative to the cylinder the principal piston may likewise be moved upwardly far enough so as to permit lowering of the vehicle or, if the vehicle is otherwise sufficiently supported, the lifting of the wheel from the ground so as to place the wheel in a convenient position for changing a tire or for making other repairs or for taking the wheel out of action. Such adjustments can be made without in any way affecting power line connections that are disposed within the conduit passing longitudinally through the shock absorber.

Further purposes, objects, features and advantages of this invention will be apparent from the following description of a typical embodiment thereof that has been shown for illustrative purposes in the accompanying drawings, wherein.

Figures 1, 2, 3:
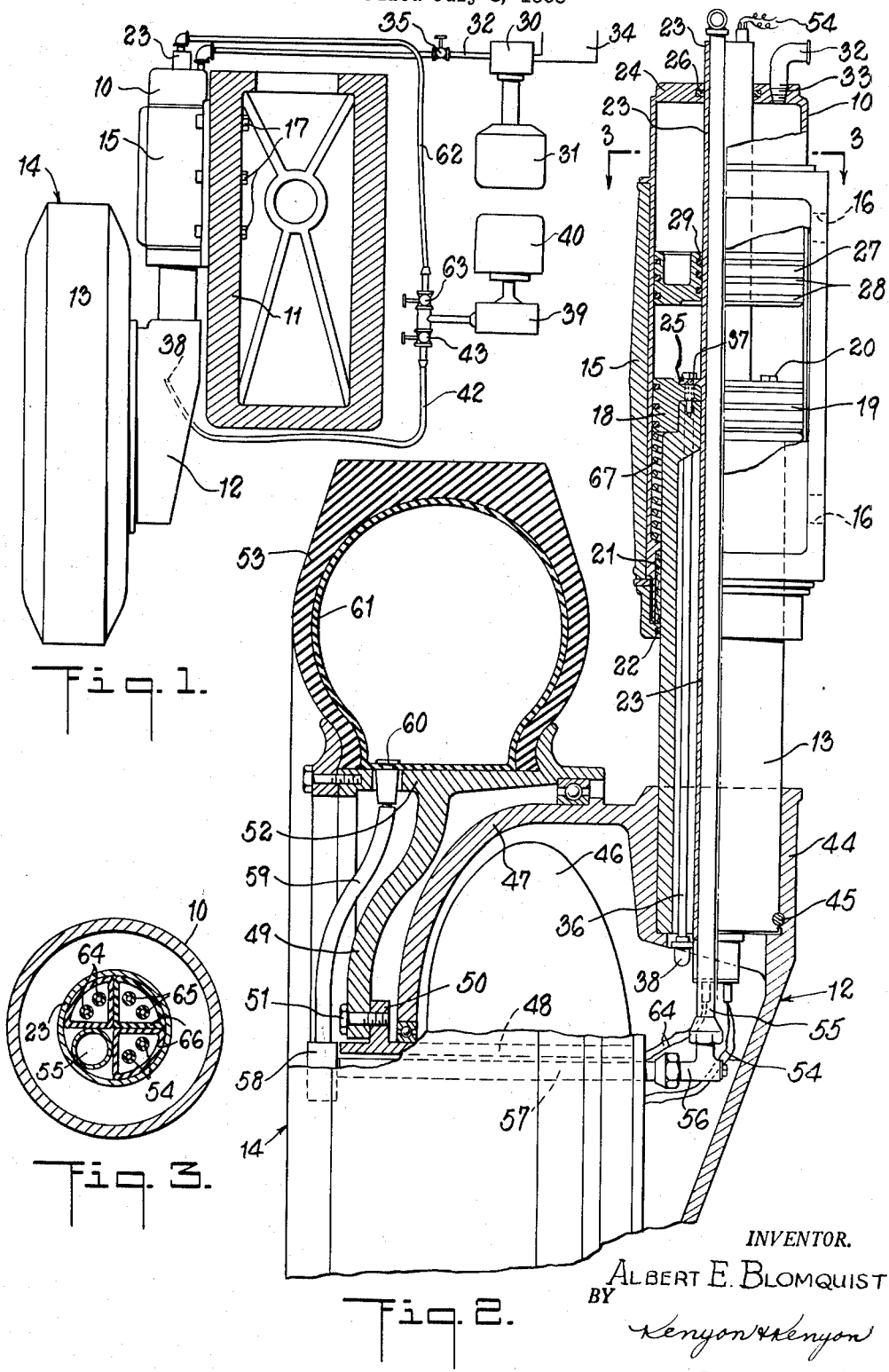
Fig. 1 is a side elevation showing a wheel in mounted relation to a frame element of a vehicle utilizing wheel mounting means embodying this invention, the frame element of the vehicle being shown in section.
Fig. 2 is a side elevation on a larger scale of the mounting means shown in Fig. 1 with the left-hand side of the shock absorber and part of the wheel construction shown in section and with parts of the right-hand side of the shock absorber broken away.
Fig. 3 is a section taken on the line 3—3 of Fig. 2.

The principal elements of the wheel mounting means shown in Figs. 1 and 2 are the cylinder 10 which is attached to the frame element 11 of the body of a vehicle, the wheel-holding member which is indicated generally by the reference character 12 and is rigidly secured by the lower end of the piston rod 13, and the wheel which is indicated generally by the reference character 14.

Any suitable means may be provided for attaching the cylinder 10 to the frame element 11, that shown consisting of a reinforcing jacket 15 having holes 16 in marginal flanges whereby the jacket 15 and the cylinder 10 held therein may be securely bolted to the frame 11 by the bolts 17. Preferably the cylinder 10 is secured to the vehicle frame element 11 so as to be straight up and down. However, substantial inclination is to be regarded as within the scope of the term "vertically disposed" as this term is used herein.

The primary piston 18 is slidably disposed within the cylinder and is provided with suitable ring means 19 whereby essentially fluid-tight sliding contact is provided with the inner surface of the cylinder. This piston 18 is secured, as by bolts 20, to the upper end of the piston rod 13. The lower end of the cylinder 10 is provided with the bushing 21 and the packing 22 whereby the piston and piston rod are firmly held in longitudinally slidable relation to the cylinder 10.

The conduit 23 extends from slightly below the lower end of the piston rod 13 longitudinally through the piston rod, through the piston 18, from the piston 18 through the interior of the cylinder 10 and through the upper end 24 of the cylinder 10 which closes off the upper end of the cylinder. The conduit 23 moves with the piston 18 and piston rod 13, being secured thereto by the flange 25 through which pass the bolts 20 that also serve to secure the piston 18 to the upper end of the piston rod 13 as stated above. The conduit is slidable in relation to the upper end 24 of the cylinder 10 and to the packing 26 for providing an essentially fluid-tight seal between the conduit 23 and the upper end 24 of the cylinder 10.

Between the piston 18 and the upper end 24 of the cylinder 10 there is provided a floating piston 27. Piston rings 28 and the packing rings 29 provide essentially fluid-tight seals for the floating piston 27 with the interior of the cylinder 10 and with the exterior of the conduit 23 respectively.

The position of the floating piston 27 relative to the cylinder 20 is determined by means of controlled introduction and withdrawal of an incompressible fluid such as oil into the upper end portion of the cylinder 10. In Fig. 1, such means has been indicated largely diagrammatically by reversible oil pump 30 operable in either direction as by the motor 31. The oil line 32 connected to the oil pump 30 communicates with the interior of the cylinder 10 through the opening 33 in the upper end 24 thereof so that, depending on the direction of activation of the oil pump 30, oil can either be forced under pressure into the upper end of the cylinder 10 from the oil supply reservoir 34 or withdrawn therefrom to the reservoir 34. When oil is forced under pressure into the upper portion of the cylinder 10 by the oil pump 30, this serves to move the floating piston 27 away from the upper end 24 of the cylinder 10 while withdrawal of oil from the upper portion of the cylinder 10 has the effect of causing the floating piston 27 to move toward the upper end 24 of the cylinder 10. For assisting in maintaining constant during normal operation the volume of oil in the upper end of the cylinder 10 and in turn the position of the floating piston 27, a shut-off valve 35 may be placed in the oil line 32.

Resilient means which serves as the shock absorbing means for receiving upward thrusts of the piston rod 13 and for carrying the portion of the weight of the vehicle imposed on the wheel is disposed between the piston 18 and the floating piston 27. This resilient means is preferably provided by a body of compressible fluid such as air that is confined within the cylinder 10 between the two pistons. Air is admitted into the space between the two pistons by the air line 36 which extends longitudinally of the piston rod 13 and communicates with the space between the pistons through air inlet valve 37 that is in the upper portion of the piston 18 and is adapted to admit compressed air and prevent its escape. Any suitable source of compressed air may be employed. In the drawings a source of compressed air has been indicated largely diagrammatically by the air compressor 39 which is actuated by the motor 40. A flexible air line 42 controlled by the valve 43 may be used to connect the compressor 39 with the air line 36 through the connection 38 which passes through the wheel-holding member 12, that, in the particular embodiment exemplified, is in the form of the housing 47. For controlling rebound, suitable means such as the compression spring 67 is disposed between the under side of the piston 18 and the lower end of the cylinder.

The foregoing constitute the principal features of the vehicle wheel mounting means of this invention. The type of wheel and wheel-holding means that may be employed therewith may take many different forms. The conduit 23 which passes throughout the length of the shock absorber is of utility as a housing for power line means for making such power line means available adjacent the lower end of the piston rod 13. This is of special advantage when the wheel-holding means 12 is in the form of a housing such as the housing 47 shown in the drawings within which the lower end of the piston rod 13 terminates. The lower end of the piston rod is firmly secured to the housing 47 as by being set in the socket 44 that is integral with the housing and within which the lower end of the piston rod may be held by suitable means such as the key member 45.

Power line means extending through the conduit 23 are available for connection to any mechanical means associated with the wheel and the wheel-holding member. For purposes of illustration in a largely diagrammatic way, a motor 46 has been shown which is rigidly secured by suitable means (not shown) to the housing 47 and by which rotation of the wheel 14 may be effected. The tubular shaft 48 is securely held by the motor at the wheel axis and is adapted to be rotated by the motor 46. The wheel 14 is shown as comprising the annular disc 49 which at its interior may be attached to the flange 50 that is integral with the tubular shaft 48 by means of the bolts 51 and which at its periphery carries the rim 52 to which the tire 53 is secured. Electric conductor wires 54 have been shown to illustrate how power line means for supplying power may be taken to a mechanism within the interior of the housing through the conduit 23 from outside power supply means. The electric conductor wires 54 may be connected to the motor 46 and after having passed through the conduit 23 may be connected to any suitable source of electric current and control means therefor. Similarly, electric conductor wires may be taken into the housing 47 through the conduit 23 to other mechanisms, as for example, a clutch mechanism or other control unit which may be actuated by being operatively connected to the wires 64 and 65 respectively that are shown in Fig. 3. If desired, the interior of the conduit 23 may be subdivided as by the partition members 66.

The power lines means that may be taken into the housing 47 through the conduit 23 may take other forms as, for example, a compressed air line which may be used, for example, for tire inflating purposes. Thus, as shown, the compressed air line 55 extends through the conduit 23, and at the bottom thereof is connected by an elbow 56 to the air tube 57 which is disposed within the tubular shaft 48 and extends to the take-off part 58 that is secured to the end of the shaft 48 for rotation with the wheel relative to the air tube 57. A flexible air line 59 connects the take-off 58 to the inlet valve 60 of the tube 61 within the tire 53. The upper end of the air line 55 is shown connected to the flexible air tubing 62 through which, under the control of the valve 63, compressed air from the compressor 39 may be used for inflating the tire. If desired, a suitable detachable hub member (not shown) may be employed in the conventional way for masking the outer central wheel parts.

While the conduit 23 has been described hereinabove as providing a passage through which certain lines are passed for supplying power from the vehicle to mechanisms carried from the lower end of the shock absorber, it is to be understood that this has been done for illustrative purposes and that other mechanisms carried from the lower end of the shock absorber may be similarly supplied with power by passage of air, electric, hydraulic or other power lines therethrough.

By way of illustration, a shock absorber device embodying this invention advantageously may be so proportioned that the floating piston 27 will have a range of travel of about six inches, depending upon the amount of oil or other non-compressible fluid that is maintained in the space between the floating piston 27 and the upper end of the cylinder 10. In this way the relative elevations as between wheel 14 and the frame element 11 of the vehicle body may be varied to a like extent. By way of further illustration, the amount of compressed air caused to be confined in the cylinder may be such as to maintain the two cylinders spaced apart by about three inches when under the normal load that the vehicle imposes on the wheel 14.

While this invention has been shown and described in connection with a typical embodiment, it is to be understood that this has been done for illustrative purposes and that the structure as shown may be varied while utilizing the features of this invention that have been described and illustrated hereinabove. Moreover, while the features of this invention are preferably employed in combination, certain of such features may be practiced separately and obtain the advantages and improvements which they afford individually or in subcombinations.

I claim:

1. Vehicle wheel mounting means which comprises a wheel-holding member, a wheel, means for mounting said wheel for rotation relative to said wheel-holding member, a vertically disposed cylinder, means for securing said cylinder to the body of a vehicle, a first piston within said cylinder, a vertically disposed piston rod rigidly secured adjacent the upper end thereof to said piston and adjacent the lower end thereof to said wheel-holding member, means for maintaining said piston and piston rod in longitudinally slidable coaxial relation to said cylinder, a conduit extending continuously through said piston rod from the lower end thereof, through said piston, from said piston through the interior of said cylinder and through the upper end of said cylinder, said conduit being movable with said piston and said piston rod in secured relation therewith and relative to said cylinder, means for providing a fluid-tight seal between said conduit and the upper end of said cylinder through which said conduit passes in slidable relation therewith, a floating piston disposed about said conduit within said cylinder between said first piston and the upper end of said cylinder and in fluid-tight slidable relation with respect to said conduit and said cylinder, means for introducing an incompressible fluid under pressure into and for removing it from the space within said cylinder between the upper end thereof and said floating piston for controlling the spacing of said floating piston from the upper end of said piston, means for maintaining a compressible fluid under pressure within said cylinder in the space between said floating piston and said first piston for resiliently supporting the weight of said vehicle imposed on said wheel, a power-receiving mechanism carried by said wheel-holding member, and power line means passing through said conduit for connecting said mechanism to power supply means.

2. Vehicle wheel mounting means according to claim 1 which comprises resilient means disposed within said cylinder between said first piston and the lower end of said cylinder for resiliently opposing movement of said piston toward said lower end of said cylinder.

3. Vehicle wheel mounting means according to claim 1 wherein said power-receiving mechanism comprises a motor that is mounted in secured relation to said wheel-holding means and is adapted to effect rotation of said wheel about said wheel-holding means, and wherein said power supply line means extending through said conduit comprises electric conductor wires for connecting said motor to a supply of electric power.

4. Vehicle wheel mounting means according to claim 1 wherein said power line means comprises a fluid-transmitting line extending through said conduit from the upper to the lower end thereof for providing fluid under pressure to said power-receiving mechanism from a source of fluid under pressure.

5. Vehicle wheel mounting means which comprises a wheel-holding member, a wheel, means for mounting said wheel for rotation relative to said wheel-holding member, a vertically disposed cylinder, a piston within said cylinder, a vertically disposed piston rod rigidly secured adjacent the upper end thereof to said piston and adjacent the lower end thereof to said wheel-holding member, means for maintaining said piston and piston rod in longitudinally slidable coaxial relation to said cylinder, means for securing said cylinder to the body of a vehicle, resilient means confined within said cylinder which bears against the upper side of said piston and is adapted for resiliently supporting the weight of said vehicle imposed on said wheel, a conduit means extending continuously longitudinally through said piston rod from the lower end thereof, through said piston, and from said piston through the interior of said cylinder and the upper end of said cylinder, said conduit means being movable with said piston and piston rod in secured relation thereto and being disposed in longitudinally slidable relation to said upper end of said cylinder through which it passes.

6. Vehicle wheel mounting means which comprises a cylinder adapted to be secured in substantially vertical position to the body of a vehicle, a piston within said cylinder, a piston rod secured to said piston, means for maintaining said piston and piston rod in longitudinally slidable relation with respect to said cylinder, a housing secured to said piston rod adjacent the end thereof remote from said piston, a wheel, means for securing said wheel to said housing for rotation relative thereto about an axis at an angle substantially 90° with respect to the axis of said cylinder and piston rod, resilient means confined within said cylinder which bears against said piston for resiliently supporting the weight of said vehicle imposed on said wheel, and a conduit extending from the interior of said housing longitudinally through said piston rod, said piston, from said piston through the interior of said cylinder, and through the end of said cylinder remote from said housing, said conduit being movable with said piston and piston rod in secured relation therewith and relative to said cylinder, and power line means passing through said conduit adapted for connecting mechanical means within said housing with power supply means.

7. Vehicle wheel mounting means according to claim 6 which comprises means for shifting the position of said resilient means longitudinally relative to said cylinder.

8. A vehicle shock absorber which comprises a cylinder closed off at one end, a first piston slidable in said cylinder, a piston rod secured to said first piston and extending through the other end of said cylinder in slidable relation therewith, a floating piston slidable in said cylinder for free movement in each direction from adjacent said first piston to adjacent said closed-off end of said cylinder, means for injecting a substantially non-compressible fluid into the portion of said cylinder adjacent said closed-off end thereof between said closed-off end of said cylinder and said floating piston to move said floating piston away from said closed-off end of said cylinder and for removing said liquid from said portion of said cylinder to move said floating piston toward said closed-off end of said cylinder and means for maintaining a compressible fluid confined within the portion of said cylinder between said first piston and said floating piston and in contact with said first piston and said floating piston as a resilient shock absorbing medium for resisting movement of said piston and piston rod toward said floating piston.

9. A vehicle shock absorber which comprises a cylinder closed off at one end, a first piston slidable in said cylinder, a piston rod secured to said first piston and extending through the other end of said cylinder, means for maintaining said piston and said piston rod in longitudinally slidable coaxial relation to said cylinder, a floating piston slidably disposed in said cylinder for free movement in each direction from adjacent said first piston to adjacent said closed-off end of said cylinder, means for injecting an incompressible fluid under pressure into and withdrawing it from the space between said floating piston and said closed-off end of said piston, and resilient means confined within said first piston and said floating piston for absorbing shocks imposed on said piston and piston rod relative to said cylinder.

10. A vehicle shock absorber which comprises a cylinder closed off at one end, a first piston slidable in said cylinder, a piston rod secured to said first piston and extending through the other end of said piston, means for maintaining said piston and piston rod in longitudinally slidable coaxial relation to said cylinder, a floating piston slidably disposed in said cylinder between said first piston and said closed-off end of said cylinder, means for injecting an incompressible fluid under pressure into and withdrawing it from the space between said floating piston and said closed-off end of said cylinder for effecting movement of said floating piston relative to said closed-off end of said cylinder, a gas line extending longitudinally through said piston and through said piston rod for providing communication between an outside source of gas under pressure and the space within said cylinder between said first piston and said floating piston, means for maintaining gas under pressure within said space for resisting movement of said first piston toward said floating piston, and resilient means disposed within said cylinder between said first piston and the end of said cylinder through which said piston rod passes for resisting movement of said first piston away from said floating piston.

References Cited in the file of this patent

UNITED STATES PATENTS 2,606,760    Schlegel _____ Aug. 12, 1952